(No Model.)

W. H. SHERWOOD.
FISHING BAIT KETTLE.

No. 299,690. Patented June 3, 1884.

WITNESSES
F. L. Osmund
N. E. Oliphant

INVENTOR
Willis H. Sherwood,
per Chas. H. Fowler,
Attorney

UNITED STATES PATENT OFFICE.

WILLIS H. SHERWOOD, OF ST. JOSEPH, MISSOURI.

FISHING-BAIT KETTLE.

SPECIFICATION forming part of Letters Patent No. 299,690, dated June 3, 1884.

Application filed May 29, 1883. (No Model.)

*To all whom it may concern:*

Be it known that I, WILLIS H. SHERWOOD, a citizen of the United States, residing at St. Joseph, in the county of Buchanan and State of Missouri, have invented certain new and useful Improvements in Fishing-Bait Kettles; and I do hereby declare that the following is a full, clear, and exact description of the same, reference being had to the annexed drawings, making a part of this specification, and to the letters and figures of reference marked thereon.

Figure 1:
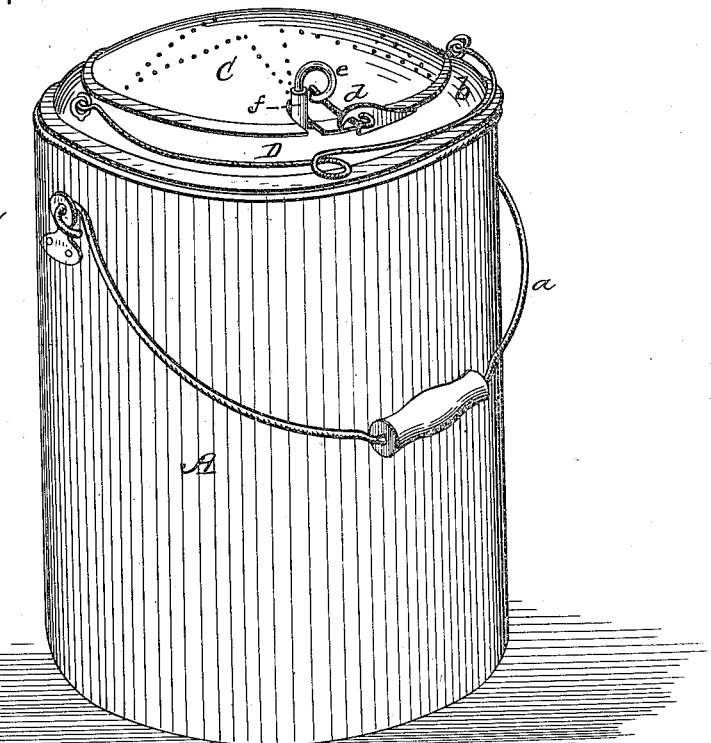
Figure 2:
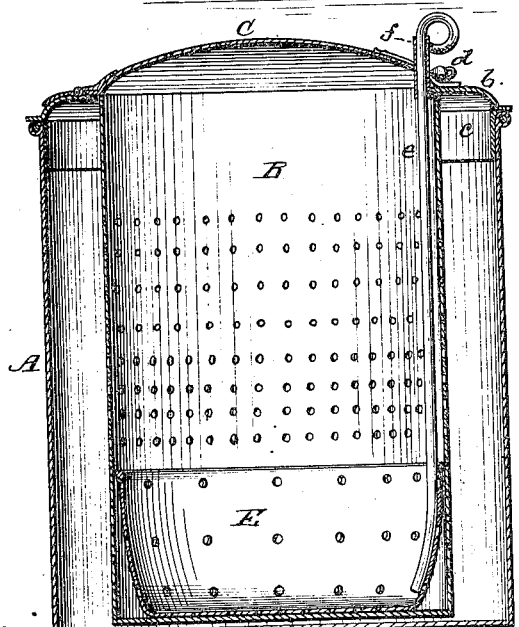

Figure 1 of the drawings is a perspective view of my invention, and Fig. 2 a vertical section thereof.

The present invention has relation to certain new and useful improvements in that class of fishing-bait kettles known as "minnow-buckets," in which is employed a supplemental bucket of perforated tin or wire-cloth, removably suspended within the outer or main bucket, to hold the minnows and admit of a free circulation of water between and around the two buckets, causing a continuous supply of fresh air, and consequently keeping the bait alive.

The object, therefore, of the present invention is to improve the construction of the above-mentioned class of fishing-bait kettles, whereby the inside pail or supplemental bucket can be removed and placed in the water, the same as a "fish-car," thereby keeping the bait alive for an indefinite time, also improving the general construction of the device, as will be hereinafter described, and subsequently pointed out in the claim.

In the accompanying drawings, A represents the outer pail, preferably of sheet metal, and provided with a suitable bail, $a$. Within the pail A is suspended a perforated sheet-metal or wire-gauze pail, B, of somewhat less diameter than the outer pail, so as to leave a space between the two for the water to circulate. Unlike the perforated buckets usually employed, the bucket or pail B is provided with an annular rim, $b$, and downwardly-extending flange $c$, thus perfectly closing the space between the pails A B at the top thereof.

To the rim $b$ is hinged a perforated cover, C, which, in connection with the rim, entirely closes the top of both pails without the necessity of a supplemental cover, while the flange $c$ holds the pail B stationary within the pail A, and prevents it from shaking when carrying the device.

The pail B is provided with a wire bail, D, to which a cord may be fastened, so that when said pail is lifted out of the pail A it can be anchored in any body of water for future use, thus keeping the bait alive for an indefinite time, while the handle or bail C serves as an additional means of elevating the pail B out of the pail A.

The cover C, although I have shown it as being perforated, may be made without perforations, and to securely fasten it in place a spring-catch, $d$, is employed. Thus the cover may be securely fastened in a closed position when the pail B is used independent of the pail A, and anchored in a stream or body of water.

The perforated pail is provided with a dipper, E, which is also perforated and provided with a wire handle, $e$, said handle extending up through a guide-sleeve, $f$, secured to the interior of the pail.

When the dipper E is elevated by means of the handle $e$, the minnows to be used as a bait for fishing may be selected at the will of the fisherman, and especially, in connection with the perforated pail, is the dipper extremely useful, as it may be used also when the pail is used while anchored in the body of water.

Having now fully described my invention, what I claim as new, and desire to secure by Letters Patent, is—

The pail A, in combination with the perforated pail B, provided with the rim $b$ and flange $c$, by which the perforated pail is suspended within the outer pail, and provided with the dipper E, substantially as and for the purpose specified.

In testimony that I claim the above I have hereunto subscribed my name in the presence of two witnesses.

WILLIS H. SHERWOOD.

Witnesses:
 WM. L. LYKENS.
 JOHN KEMMIN.